United States Patent [19]

Walk et al.

[11] Patent Number: 4,624,360
[45] Date of Patent: Nov. 25, 1986

[54] PROCESS AND APPARATUS FOR SLIPPING TUBES ONTO PEGS OF A TRANSPORT BELT

[75] Inventors: Johann Walk; Rainer Studtmann; Fritz Haller, all of Ingolstadt, Fed. Rep. of Germany

[73] Assignee: Schubert & Salzer, Ingolstadt, Fed. Rep. of Germany

[21] Appl. No.: 389,875

[22] Filed: Jun. 18, 1982

[30] Foreign Application Priority Data

Jun. 19, 1981 [DE] Fed. Rep. of Germany ....... 3123997

[51] Int. Cl.⁴ ............................................. B65G 47/24
[52] U.S. Cl. .................................... 198/398; 198/395; 242/35.5 A; 57/272
[58] Field of Search ............... 198/400, 388, 395, 397, 198/398; 57/272, 276; 242/35.5 A, 41, 46; 222/9, 13, 157

[56] References Cited

U.S. PATENT DOCUMENTS

| | | | |
|---|---|---|---|
| 3,148,495 | 9/1964 | King, Jr. et al. | 242/41 |
| 3,710,922 | 1/1973 | Lanphere et al. | 198/395 |
| 3,863,751 | 2/1975 | Vignon | 198/400 |
| 4,099,609 | 7/1978 | Kieronski et al. | 198/395 |
| 4,338,778 | 7/1982 | Suzuki et al. | 198/395 X |

FOREIGN PATENT DOCUMENTS 2163169 9/1973 Fed. Rep. of Germany .

*Primary Examiner*—Joseph E. Valenza
*Assistant Examiner*—Dennis Williamson
*Attorney, Agent, or Firm*—Julian W. Dority

[57] ABSTRACT

A method and apparatus for slipping tubes on pegs carried on a transport belt which extends along a spinning machine or twisting machine. A slipping-on apparatus for said tubes is located above the transport belt and inserts the tubes on the pegs. A sensing device monitors the seating of the tubes on the pegs and a lifting off device removes the tubes that are improperly seated on the pegs. After an improperly seated tube is removed from the peg, another tube is inserted thereon.

12 Claims, 4 Drawing Figures

PROCESS AND APPARATUS FOR SLIPPING TUBES ONTO PEGS OF A TRANSPORT BELT

BACKGROUND OF THE INVENTION

The invention relates to a process for slipping tubes onto pegs of a transport belt associated with a spinning machine or twisting machine, by means of a slipping-on apparatus and to an apparatus for carrying out the process.

It is generally known to feed tubes to a spinning machine or to a twisting machine by means of a transport belt extending over the length of the machine with the tubes being slipped onto pegs of the transport belt by means of a slipping-on apparatus at one end of the machine. Chutes, tube-cages and conical pocket-wheels are customarily used as slipping-on apparatuses British Pat. No. 1,155,320 German Patent Specification No. 2,163,169 and U.S. Pat. No. 3,090,476 . In this slipping-on operation, it can occur that, on account of damage to the base of the tube, or for other reasons, the tubes are not correctly slipped onto the pegs and, in consequence of this, are not grasped by the gripper of the cop-changing apparatus during the subsequent operation of transferring the tubes onto the spindles of the spinning or twisting machine. For this reason, apparatuses have already been proposed which identify tubes seated incorrectly on the pegs of the transport belt and trigger a warning signal after the operation of slipping-on the tubes has been completed and after they have been transported onwards (U.S. Pat. No. 4,338,778 and German Patent Specification No. 2,433,848). However, these known apparatuses do not provide anything more than a conventional and usual display device for calling up an operator.

SUMMARY OF THE INVENTION

In contrast to the above, the object of the invention is to provide a process and an apparatus which ensure that all the tubes leaving the slipping-on apparatuses are seated correctly on their pegs, and that only tubes which are correctly seated reach their predetermined readiness position.

This object is achieved, according to the invention, by a process wherein the mode of operation of the slipping-on apparatus is monitored with regard to the orderly slipping of the tubes onto their pegs, and a tube which has been incorrectly slipped on is reported, whereupon this tube is discarded and the slipping-on operation is repeated by the slipping-on apparatus with a new tube.

When a chute is used as the slipping-on apparatus, the tube which has been incorrectly slipped on is pushed back into the chute after which the chute is swung out of the region of the transport belt, and the tube is discarded whereupon the chute is again swung over the peg which has been cleared for putting on a new tube.

The apparatus constructed in accordance with the present invention includes a transport belt which extends along the spinning machine or twisting machine and carries the pegs receiving the tubes. A slipping-on apparatus for tubes is located above the transport belt and a sensing device which monitors the seating of the tube on the peg and a lifting-off device for a tube which has been incorrectly slipped on, are assigned to the slipping-on apparatus. The lifting-off device is capable of being activated by a control unit which is connected to the sensing device and which also determines the mode of operation of the slipping-on apparatus.

When a chute is employed, the operation of discarding the tube is rendered possible by the fact that the chute can be swung horizontally at right angles to the transport belt. The operation of swinging the chute out of the region of the transport belt is carried out in a simple manner by using a cam which is capable of being pressed against the chute. In a further simplification of the apparatus, the cam is part of the lifting-off device so that only one drive is needed for both the cam and the lifting-off device.

Designing the lifting-off device as a fork results in particularly reliable removal of the tube from its peg. Due to the fact that the prongs of the fork have a wedge shape, it becomes possible to lift off the tube without any additional upward movement of the lifting-off device. The lifting-off device can expediently be driven pneumatically. In order to prevent the discarded tubes from falling onto the floor and thereby becoming an accident hazard, the tubes can be discarded into a collecting container.

DESCRIPTION OF A PREFERRED EMBODIMENT

Figure 1:
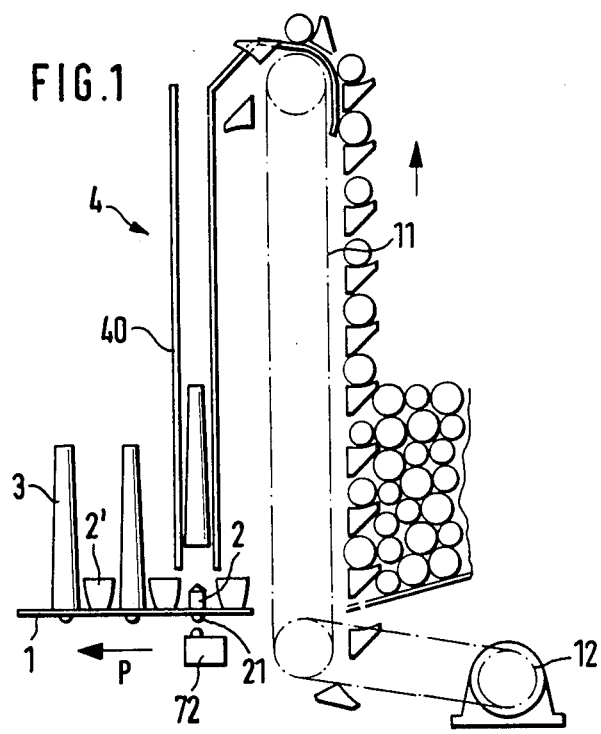
FIG. 1 shows a slipping-on apparatus with transport belt, in section, seen from the front.

A transport belt is marked 1 which extends in a known manner along a spinning or twisting machine, this machine not being shown, and which carries pegs 2 onto which tubes 3 are slipped (FIG. 1). Between the pegs 2, cups 2' are provided which subsequently receive the finished cops or spools. As can be seen from FIGS. 2 and 3, the pegs 2 are arranged at an angle with respect to the vertical, but they can also stand vertically. Each peg 2 possesses a base part 20 having a diameter which is larger than that of the peg. A correctly slipped-on tube 3 is seated on this base part. Instead of a base part 20, the transport belt 1 can also, if appropriate, serve as a surface on which the tube can stand. A slipping-on apparatus 4 is located above the transport belt 1 in a known manner at one end of the machine. In the illustrative embodiment, a chute 40 is employed as a slipping-on apparatus. The tubes 3 are individually fed to the chute by a lifting conveyor 11 which is driven by a motor 12. The lifting conveyor 11 extends into a tube container and each conveying slat removes on each occasion one tube from the container. The tube 3 is introduced in a predetermined position into the chute 40 and falls through the chute onto the peg 2, whereupon it normally, that is to say, during fault-free operation covers the full peg length. The chute 40 which is open both at the top and at the bottom, has a cut-out 41 (FIG. 2) on its side wall facing away from the lifting conveyor 11 thus enabling the tube 3 to clear the chute 40 as the transport belt 1 moves in the direction of the arrow P in FIG. 1.

The chute 40 is mounted so that it can pivot on a horizontal shaft 42 which is located essentially parallel to the transport belt 1. By this means, it can be horizontally swung out of its working position at right angles to the transport belt 1 and brought out of the region of the transport belt 1. A cam 50 is provided for swinging out the chute 40. The cam 50 is attached to the piston rod 90 of a cylinder 9 and expediently forming part of a lifting-off device 5 for any tube 3 which is slipped onto the peg 2 incorrectly. Only one drive is therefore required for the cam 50 and the lifting-off device 5. The lifting-off device 5 has the shape of a fork with two prongs 51 and 52 (FIG. 4) which are designed according to FIGS. 2 and 3 with a wedge shape. This configuration is advantageous insofar as it enables the tube to be lifted from the peg without any additional upward movement of the lifting-off device. The cam 50 with the lifting-off device 5 is actuated by means of a control unit 7, for example, by a programmable control unit which also determines the mode of operation of the slipping-on apparatus 4. A switch 71 which can be actuated by the cam 50 and a switch 72 which can be acutated by cams 21 which are attached to the transport belt 1 beneath the pegs 2 are electrically connected to the control unit 7.

The control unit 7 is additionally connected to a sensing device 6 which is assigned to the chute 40 and which monitors the seating of the tube 3 on the peg 2 in that it senses the head of the tube present in the chute 40 either without physical contact or also with the aid of mechanical means. In the illustrative embodiment, sensing is effected by means of a beam of light which is produced by a light emitter 60 and which is incident, through openings in the end walls of the chute 40, onto a light receiver 61. The sensing device 6 is located on the chute 40 at a height above the transport belt 1 such that the beam of light, leaving the light emitter 60 passes the upper edge of a tube 3 sitting on the base part 20 at a short distance above this edge. The light emitter 60 is supplied with current from the control unit 7. The control unit 7, which is electrically connected to the light receiver 61, controls a magnetic valve 8 containing electromagnets 80 and 81 through which valve compressed air is supplied to the cylinder 9 in an alternating manner through two lines 82 and 83. The magnetic valve 8 is connected, via a line 84, to a source of compressed air, which is not shown. Lines 85 and 86 lead from the magnetic valve into the open air.

A pneumatic drive of the lifting-off device and its configuration as a fork with wedge-shaped prongs are preferred. However, these features do not exclude the use of another drive device or a different configuration of the lifting-off device.

In order to slip on the tubes, the endless transport belt 1 which is driven by a motor (not shown) is set into motion. As soon as a peg 2 is positioned below the chute 40, the switch 72 is actuated by the cam 21 which is attached beneath the peg 2. The switch signal is fed to the control unit 7 which thereupon, on the one hand, triggers the stopping of the drive of the transport belt and, on the other hand, causes the lifting conveyor 11 to be driven by the motor 12 until a single tube 3 is conveyed into the chute 40. The tube falls in a predetermined position through the chute 40 and onto the peg 2 interrupting the light barrier and, if it has fallen over the full peg length and is seated on the base part 20, it immediately clears the light barrier. The signal from the sensing device resulting from the falling of the tube is fed to the control unit 7, which triggers the onward movement of the transport belt 1 until the next peg for receiving a tube is located below the chute 40 and the cam 21 located below the chute again actuates the switch 72. If the tube has been slipped on correctly, the lifting-off device 5 with the cam 50 remains in the inactive position shown in FIG. 2.

Figure 2:
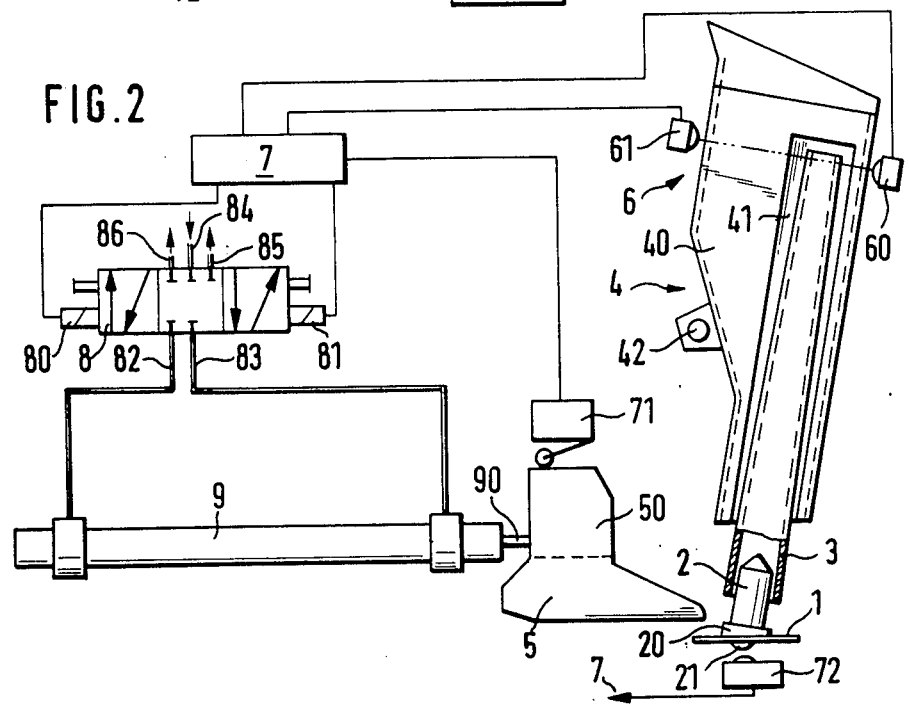
FIG. 2 shows the slipping-on apparatus from FIG. 1 with a system for monitoring and discarding the tubes in side view.
Figure 3:
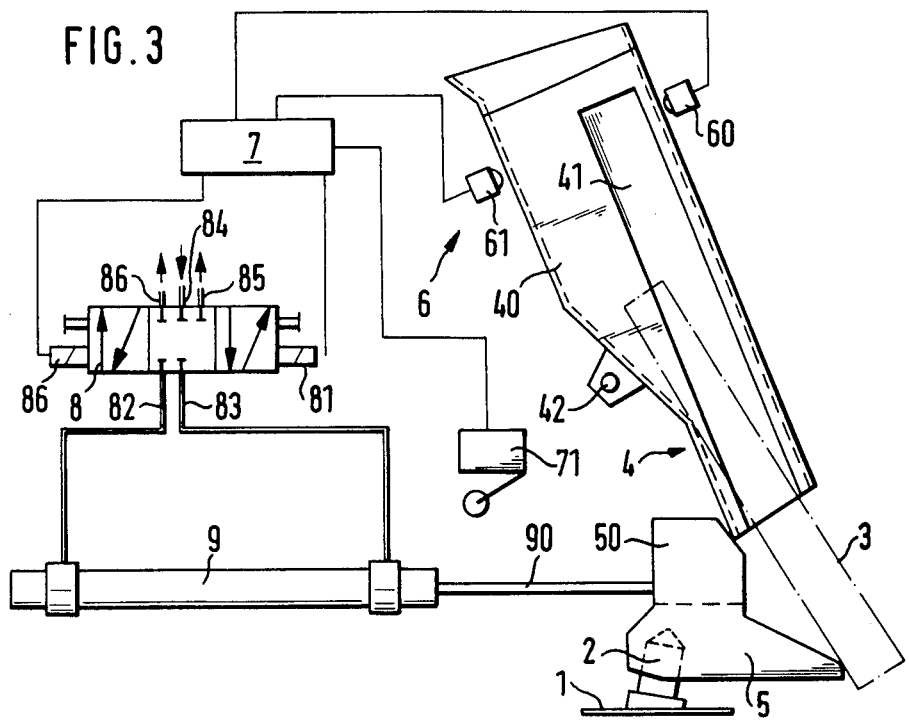
FIG. 3 shows the apparatus according to FIG. 2 in the position in which a tube is discarded.
Figure 4:
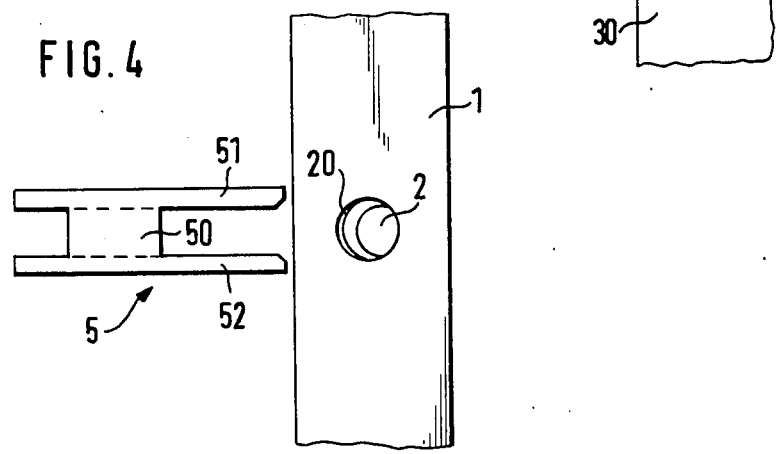
FIG. 4 shows the tube lifting-off device from FIG. 2 in plan view.

If, on the other hand, a tube 3 as shown in FIG. 2 has not fallen over the full peg length, and the interruption of the light barrier by the tube thereby exceeds a defined time, the control unit 7 acts on the electromagnet 80 and exites it causing compressed air to flow through the line 82 into the cylinder 9 which causes its piston with the piston rod 90 to be pushed towards the transport belt 1. At the same time, the prongs 51 and 52 of the lifting-off device 5, between which prongs the peg 2 comes to be located, initially engage on the tube 3 and, due to their wedge-shaped configuration, lift it completely off the peg 2. By this means, the tube 3 is conveyed back into the chute 40, either completely, or at least to an extent such that it does not obstruct the subsequent horizontal swinging movement of the chute 40. The prongs 50 and 51 of the lifting off device hold the tube in this position until the piston rod 90 as its forward movement proceeds further pushes the cam 50 against the chute 40 and pivots the latter about the shaft 42 (FIG. 3). As a result of this movement, the tube 3 clears the lifting off device 5 and slides out of the chute 40. In order to prevent the discarded tube 3 from falling onto the floor, it is advantageously caught in a collecting container 30.

The discarding of the tube 3 causes the light barrier to become clear again. As a result of this, the light-receiver 61 outputs a signal to the control unit 7 which thereupon after a defined time which is fixed, for example by means of a time delay relay, cuts off the current from the electromagnet 80 of the magnetic valve 8 and excites the electromagnet 81. The compressed air which now flows through the line 83 into the cylinder 9 pushes the piston of this cylinder and consequently the lifting off device 5 with the cam 50 back into the inactive position according to FIG. 2 while the compressed air in the rear portion of the cylinder 9 escapes through the line 86. The chute 40, released by the cam, again swings over the transport belt 1 into its drop position. When the lifting-off device 5 reaches the inactive position, the cam 50 actuates the switch 71, the signal from which is supplied to the control unit 7 as a result of which the dropping of a new tube is triggered down through the chute and onto the peg which is now clear again.

The invention has been described in conjunction with the use of a chute as the slipping-on appartus. It can, however, also be employed with other slipping-on apparatuses, for example, with the tube cages and pocket conveyors mentioned initially.

At the same time, possible modifications are within the ability of the expert. If the monitoring of the tubes by means of a beam of light is retained, it would be possible to locate reflectors in the pockets or slots of a pocket-wheel, these reflectors being exposed when the tubes are seated correctly on the pegs and reflecting the beam of light back onto the light receiver. If, on the other hand, when a tube has been slipped on incorrectly, the reflector remains masked by the head of the tube and, due to this, the beam of light is not reflected, the control unit accordingly sets the lifting-off device into operation and the tube is pushed back into its pocket from which it subsequently falls when the pocket-wheel rotates further. The slipping-on operation is then repeated with a new tube which falls from the next pocket onto the peg which has been cleared. If this tube seats correctly on the peg, the transport belt, which was stopped for the slipping-on operation, is then driven again until the next peg is located in the slipping-on position.

While a preferred embodiment of the invention has been described using specific terms, such description is for illustrative purposes only, and it is to be understood that changes and variations may be made without departing from the spirit or scope of the following claims.

What is claimed is:

1. A process for slipping tubes onto pegs of a transport belt on spinning machines or twisting machines, comprising the steps of:
    slipping the tubes onto the pegs in an orderly fashion using a slipping-on apparatus;
    monitoring during the slipping-on step the orderly slipping of the tubes onto the pegs and sensing a tube which has been incorrectly slipped on a peg;
    lifting off and pushing back into said slipping-on apparatus an incorrectly slipped-on tube; and
    discarding said incorrectly slipped on lifted-off tube and repeating the slipping-on step by the slipping-on apparatus using a new tube for the affected peg.

2. A process as in claim 1 wherein said slipping-on apparatus comprises a chute and said process further comprises the steps of:
    swinging said chute out away from said transport belt and discharging said incorrectly slipped-on lifted-off tube;
    swinging again said chute over the affected peg from which said incorrectly slipped-on peg was lifted off; and
    slipping a new tube onto said peg.

3. Process as claimed in claim 1, wherein said incorrectly slipped-on tube is discarded laterally of the transport belt by moving said slipping-on apparatus across the transport belt.

4. An apparatus for selectively slipping tubes on and off pegs carried on a transport belt which extends along a spinning machine or twisting machine, said apparatus comprising:
    a slipping-on apparatus located above said belt for placing said tubes on said peg;
    sensing means for monitoring the seating of said tubes on said pegs and for generating a signal responsive to an incorrectly seated tube on a peg;
    lifting off means responsive to said sensing means for lifting off incorrectly seated tubes and pushing back lifted-off tubes into said slipping-on apparatus; and
    control means, responsive to said sensing means, for controlling operation of said lifting off means so as to lift off an incorrectly seated tube, and for controlling operation of said slipping-on apparatus so as to selectively place tubes on said pegs.

5. An apparatus as in claim 4 wherein said slipping-on apparatus includes a chute for guiding tubes located therein onto said pegs, and means for mounting said chute to be swung horizontally at a right angle to the transport belt.

6. Apparatus as claimed in claim 5 further comprising:
    a cam means (50) for selectively being pressed against the chute for swinging said chute horizontally.

7. Apparatus as claimed in claim 6 wherein
    said cam means comprises a part of said lifting-off means (5).

8. Apparatus as claimed in claim 4 wherein:
    said lifting-off means comprises fork means being movable horizontally across said transport belt and having wedge-shaped prongs such that said tube incorrectly slipped on a peg is pushed back onto said slipping-on apparatus by means of said wedge-shaped prongs.

9. Apparatus as claimed in claim 4, wherein said lifting-off means are driven penumatically.

10. Apparatus as claimed in claim 4, further comprising a collecting container for receiving said discarded tubes.

11. Apparatus as claimed in claim 5, wherein said means for lifting off said improperly seated tube also pivots said chute horizontally at right angles to said transport belt for discarding said improperly seated tube.

12. An apparatus for placing tubes on pegs provided on a transport belt which extends along a spinning machine or twisting machine comprising:
    means for slipping tubes on said pegs carried on said transport belt;
    means for monitoring the seating of said tubes on said pegs generating a signal responsive to a tube not being fully seated on a peg, and
    means responsive to said signal produced by said monitoring means for lifting said improperly seated tube from said peg, said means for slipping said tubes on said pegs including:
    (i) a pivotably mounted chute means for guiding tubes loaded therein onto said pegs, and
    said means for lifting said improperly seated tube also pivoting said chute means horizontally at right angles to said transport belt when discarding said improperly seated tube.

* * * * *